3,475,482
α-AMINOCARBOXYLIC ACID ESTERS
Gustav Ehrhart, Bad Soden, Taunus, Ernst Lindner, Frankfurt am Main, and Heinrich Ott, Eppstein, Taunus, Germany, assignors to Farbwerke Hoechst Aktiengesellschaft vormals Meister Lucius & Bruning, Frankfurt am Main, Germany, a corporation of Germany
No Drawing. Filed May 24, 1966, Ser. No. 552,405
Claims priority, application Germany, June 1, 1965, F 46,207
Int. Cl. C07c 101/04; A61k 27/00
U.S. Cl. 260—471  4 Claims

ABSTRACT OF THE DISCLOSURE

Cardioactive compounds of the formula

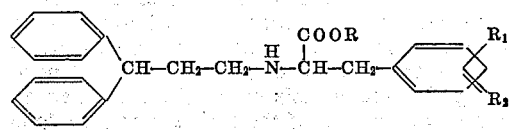

wherein R is lower alkyl and $R_1$ and $R_2$, which may be the same or different, are hydrogen, lower alkyl, or halogen, and salts thereof. Methods for making these compounds.

---

The present invention provides new aminocarboxylic acid derivatives and their salts which correspond to the general Formula I

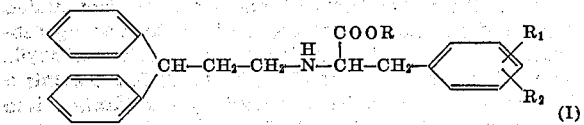
(I)

wherein R represents a low molecular weight alkyl radical and $R_1$ and $R_2$, which may be identical or different, represent hydrogen, low molecular weight alkyl radicals or halogen, and a process for their manufacture.

These new compounds have a very favorable action on the heart and blood vascular circulation and are far less toxic than the known compounds of similar structure used for curing cardiac and circulatory disorders, of U.S. Patent 3,152,173.

The new aminocarboxylic acid derivatives of the general Formula I

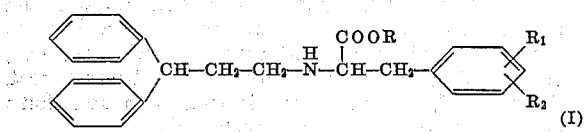
(I)

in which R represents a low molecular weight alkyl radical and $R_1$ and $R_2$, which may be identical or different, represent hydrogen, low molecular weight alkyl radicals or halogen, can be prepared, for example, (a) By reacting 1,1-diphenyl-3-aminopropane of the Formula II

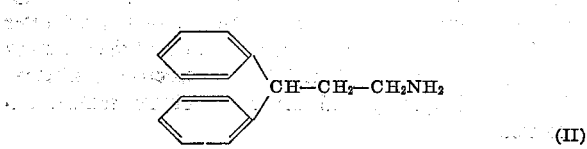
(II)

with keto-carboxylic acid derivatives of the general Formula III

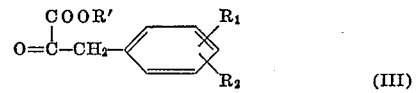
(III)

in which R' represents a hydrogen atom or a lower alkyl group, and reducing, simultaneously or subsequently, the reaction product, or (b) By reacting aminocarboxylic acid derivatives of the general Formula IV

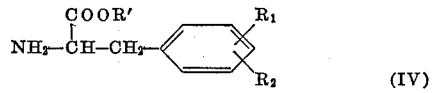
(IV)

in the presence of aldehydes of the Formula V or VI

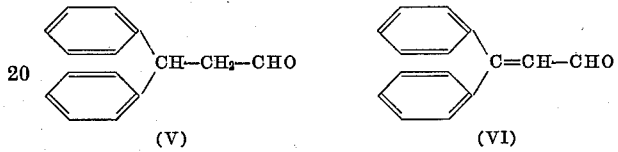
(V)  (VI)

and reducing, simultaneously or subsequently, the reaction product and hydrogenating any aliphatic C—C double linkage which may be present, or (c) By reacting 1,1-diphenyl-3-halogenopropanes of the general Formula VII

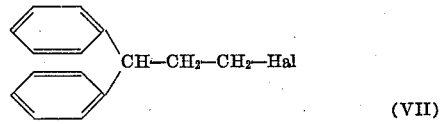
(VII)

in which Hal represents a halogen atom, with aminocarboxylic acid derivatives of the general Formula VIII

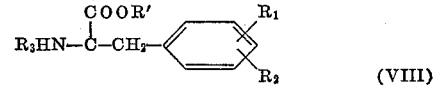
(VIII)

in which $R_3$ represents a hydrogen atom or the benzyl radical, if desired or required in the presence of agents splitting off hydrogen halide, or (d) By reacting diphenyl-methane or diphenyl-acetonitrile with halogen-substituted aminocarboxylic acid derivatives of the general Formula IX

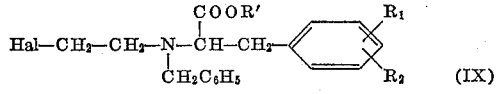
(IX)

in the presence of agents splitting off hydrogen halide and replacing the nitrile group which may be present in the reaction products by a hydrogen atom by heating with sodium amide in an inert organic solvent, and removing by catalytic hydrogenation the N-benzyl group which may be present, and if compounds of the general Formulae III, IV, VIII, and IX are used in which R' represents a hydrogen atom, esterifying the free carboxyl group by reaction with a low molecular weight alcohol, and, if desired or required, converting the basic compounds thus obtained into their salts by means of mineral or organic acids.

The compounds of the present invention are distinguished by their excellent action on the heart and on the blood circulation, while being far less toxic than the known compounds.

The reaction of 1,1-diphenyl-3-aminopropane of the Formula II with keto-carboxylic acids or keto-carboxylic acid esters of the Formula III according to the method described under (b) can be effected, for example, by catalytic hydrogenation of equimolar amounts of both compounds in the presence of an inert solvent. As catalysts, there may be used metals of the 8th group of the Periodic System, preferably noble metals. As solvents, there may be used the solvents generally used for hydrogenation, for example, alcohols, water or aqueous alcohols. Nickel catalysts, preferably Raney catalysts, may also be used. The reduction may also be effected by means of sodium borohydride, it being advantageous first to prepare the condensation product of amine and keto-carboxylic acid derivative, if desired or required at slightly elevated temperatures, and, if desired or required, in the presence of an inert organic solvent, for example benzene or toluene. After dilution with a suitable solvent, for example, a low molecular weight alcohol, if desired in the presence of water, reduction is effected by adding sodium borohydride. Furthermore, the reduction may also be effected with nascent hydrogen, for example, with aluminum amalgam and alcohol and sodium amalgam. If a keto-carboxylic acid (R'=hydrogen) is used, it is recommended to use the amine component in an excess quantity.

As keto-carboxylic acids which may be used as starting substances for the reaction according to method (a), there may be mentioned, for example, phenyl-pyruvic acid, 3,4-dimethyl-phenyl-pyruvic acid, 3- (or 4-)-methyl-phenyl-pyruvic acid, 2- (or 3- or 4-)-chlorophenyl-pyruvic acid, 2-(3- or 4-)-ethylphenyl-pyruvic acid and the low molecular weight alkyl esters of the mentioned acids, the methyl and ethyl esters being preferred.

The preparation of the products of the invention according to the method described under (b) is particularly advantageous. For this reaction, there may be used as starting substances: phenylalanine or its low molecular weight alkyl esters, in particular the methyl or ethyl ester, furthermore 2-(3-, 4-)-methylphenylalanine, 3,4-dimethylphenylalanine, 2-(3-, 4-) - chlorophenylalanine, 2-(3-, 4-)ethylphenylalanine and the corresponding low molecular weight alkyl esters, preferably the methyl or ethyl ester. The reaction with aldehydes of the Formulas V or VI with simultaneous or subsequent reduction is carried out principally according to the method described under (a), starting from 1,1-diphenyl-3-aminopropane. The aldehyde of the Formula VI indicated as the starting substance can be prepared, for example, by the method described in Compt. rend. 250, 150 [1960] from 1,1-diphenyl-1-hydroxy-propyne (2). If this aldehyde is hydrogenated catalytically in the presence of the phenylalanine derivative, the aliphatic C—C double linkage is hydrogenated simultaneously. If the unsaturated aldehyde is first condensed with the phenylalanine derivative and then reduced, for example, with the aid of sodium borohydride, the C—C double linkage must be eliminated subsequently by catalytic hydrogenation. The catalytic hydrogenation of the double linkage is carried out in the usual manner, as described under (a). As catalysts, noble metals of the 8th group of the Periodic System are preferably used.

According to the method described under (c), which is another advantageous method of carrying out the process of the present invention, the said phenylalanine derivatives can also be reacted with 1,1-diphenyl-3-halogeno-propanes. As the propane derivative 1,1-diphenyl-3-chloro- or bromo-propane is preferably used. The reaction can be effected by prolonged heating, if desired or required in a suitable solvent such as ether, chloroform or an aromatic hydrocarbon. It is suitable to use 2 mols of the amine for binding the hydrogen halide set free. The hydrogen halide may also be bound by the usual agents such as alkali metal or alkaline earth metal carbonates or hydroxides, or by organic bases such as pyridine or quinoline, which may at the same time serve as the solvent.

The method described under (c) can also be carried out with phenylalanine derivatives having an amino group which carries a benzyl radical. This benzyl radical is eliminated subsequently by catalytic hydrogenation in the presence of noble metals of the 8th group of the Periodic System.

Finally, the products of the present invention may be obtained by reacting diphenyl-methane or diphenyl-acetonitrile with halogen-substituted phenylalanine derivatives of the general Formula IX. The compounds of the general Formula IX used as the starting compounds can be prepared, for example, by reacting N-benzyl-phenylalanine derivatives with ethylene oxide or ethylene-chlorohydrin, the N-hydroxyethyl compound first obtained being converted into the N-halogeno-ethyl compound of the general Formula IX by reaction with a halogenating agent, for example, thionyl chloride. The reaction of these N-halogeno-ethyl-N - benzyl - phenylalanine derivatives with diphenyl-methane or diphenyl-acetonitrile is preferably carried out in inert organic solvents, for example, benzene, toluene or xylene. As agents splitting off halogen, there may be mentioned, for example, sodium amide, sodium phenyl, lithium phenyl and metallic sodium. It is advantageous to dissolve or to suspend two of the required reaction components (diphenyl-methane or diphenyl-acetonitrile, the agent splitting off hydrogen halide and halogeno-ethyl-phenylalanine) in an inert solvent and then to add the third component portionwise. When the addition is complete, it is suitable to boil the whole for some time under reflux and, after addition of water, to work up the reaction mixture in the usual manner, for example by extraction of the basic components from the organic solvent by means of dilute acids.

In the reaction with diphenyl-methane, it is particularly advantageous to use sodium phenyl as the agent splitting off hydrogen halide. If diphenyl-acetonitrile is used as the starting substance, the nitrile group still present must be converted into a hydrogen atom. This can be effected by prolonged heating with sodium amide in benzene or toluene under reflux. The n-benzyl group is then split off as described above by catalytic hydrogenation in the presence of noble metal catalysts.

If, in the above-described reactions, the free amino acids and not their esters are used as the starting substances, the obtained 1,1-diphenyl-propyl-aminocarboxylic acids of the general Formula I, in which R represents a hydrogen atom, may be converted by esterification into the products of the Formula I, in which R represents a low molecular weight alkyl radical. The alcohols used for the esterifications are preferably methanol or ethanol, but propyl alcohol or butyl alcohol may also be used. The esterification is effected in the usual manner, for example by heating the two components for several hours in the presence of agents splitting off water, for example catalytic amounts of concentrated sulfuric acid, hydrochloric acid or by azeotropic distillation.

As basic compounds, the products of the invention can be converted into the corresponding salts by means of mineral or organic acids. As mineral acids, there may be used, for example, hydrohalic acids such as hydrochloric or hydrobromic acid, sulfuric acid, phosphoric acid, and amido-sulfonic acid. As organic acids, there may be used, for example, acetic acid, propionic acid, lactic acid, maleic acid, succinic acid, tartaric acid, benzoic acid, salicyclic acid, citric acid, aceturic acid, oxethane-sulfonic acid and ethylene-diamine-tetraacetic acid.

The products of the present invention possess a very good action on the heart and on the blood circulation. Thus, for example in the test on an isolated heart of a guinea pig according to Langendorff, the administration of a single injection of 54 of N-[3,3-diphenylpropyl(1)]-3,4-dimethylphenylalanine methyl ester or N-[3,3-diphenylpropyl(1)]-phenylalanine methyl ester or N-[3,3-diphenylpropyl(1)] - p - chlorophenylalanine-ethyl ester produces an augmentation of the perfusion of the coronary arteries by 105%, 84% and 70% respectively, whereas the heart frequency and the beat volume remain unaffected.

The products of the present invention have the particular advantage of being far less toxic than the known compounds of similar structure, while having the same or a better dilatatory action on the coronary arteries. Thus, for example, the minimum lethal dose i.v. in the mouse of the above-mentioned products is 150 mg./kg., 150 mg./kg. and 100 mg./kg., respectively. In contradistinction thereto, the minimum lethal dose i.v. of 2-[N-(1',1' - diphenyl - propyl-3')] - amino-3-phenyl-propane known from U.S. Patent 3,152,173 is at 15 mg./kg. (test in the mouse).

The compounds of the present invention are active in their free form as well as in the form of their salts and may be administered orally or parenterally. They may therefore, be used as such or in admixture with the usual pharmaceutical carriers and adjuvants such as water, starch, lactose, or talc or with the usual pharmaceutical auxiliaries such, for example, as stabilizers. The products may be made up in the usual dosage unit form, for example, into tablets, dragées, capsules, ampoules, solutions, emulsions or suspensions.

The following examples illustrate the invention but they are not intended to limit it thereto:

EXAMPLE 1

N-[3,3-diphenyl-propyl(1)]-phenylalanine methyl ester hydrochloride

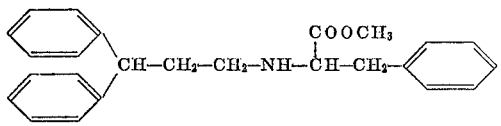

10.7 g. (1/20 mol) of phenylalaninemethyl ester-HCl were dissolved in 150 ml. of absolute of alcohol. A solution of 2.7 g. (1/20 mol) of sodium methylate in a small amount of absolute alcohol was added. After separation by filtration of the NaCl which had precipitated, 10.5 g. (1/20 mol) of diphenylpropionaldehyde were added and the mixture was shaken at about 50° C. with palladium and hydrogen. When the reduction was complete, the solution was concentrated under reduced pressure, the light yellow oil which remained behind was dissolved in ether and shaken with 25 ml. of 2 N HCl. Upon trituration, the white hydrochloride of N-(3,3-diphenyl-propyl(1))-phenylalanine methyl ester crystallized at once and was filtered off with suction, washed with ether and several times with small amounts of cold water and then dried. After recrystallization from a mixture of absolute alcohol and ether, 5.6 g. of N-(3,3-diphenyl-propyl(1))-phenylalanine methyl ester. HCl, melting at 180–181° C., were obtained.

EXAMPLE 2

N-[3,3-diphenyl-propyl(1)]-p-chlorophenylalanine ethyl ester hydrochloride

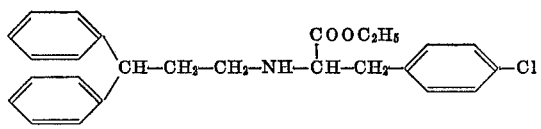

17.5 g. of p-chlorophenylalanine ethyl ester and 16.3 g. of diphenyl-propionaldehyde were dissolved in methanol and 2 g. of NaBH$_4$ were added in small portions. After half an hour, the whole was acidified with dilute HCl, whereupon the hydrochloride crystallized immediately. After filtration with suction, the crystals were washed with ether and water and dried in air. After recrystallization from hot absolute alcohol, 17 g. of N-(3,3 - diphenyl - propyl(1))-p-chlorophenylalanine ethyl ester-HCl, melting at 203–204° C., were obtained.

EXAMPLE 3

N-[3,3-diphenylpropyl(1)]-3,4-dimethylphenylalanine methyl ester · HCl

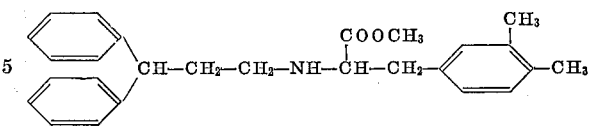

8.3 g. of 3,4-dimethylphenylalanine methyl ester and 8.4 g. of diphenyl-propionaldehyde were combined, whereupon the mixture heated up to about 40° C. After addition of methanol, the mixture was shaken at 40–50° C. with palladium and hydrogen. The solvent was removed by distillation under reduced pressure, and the residue was combined with ether and dilute hydrochloric acid, whereupon the oily hydrochloride separated and crystallized soon. The crystalline precipitate was filtered off with suction, washed with a small amount of water and ether and dried. After recrystallization from hot absolute alcohol, 10.2 g. of N-(3,3-diphenyl-propyl(1))-3,4-dimethylphenyl-alanine methyl ester-hydrochloride, melting at 177° C., were obtained.

We claim:
1. A compound of the formula

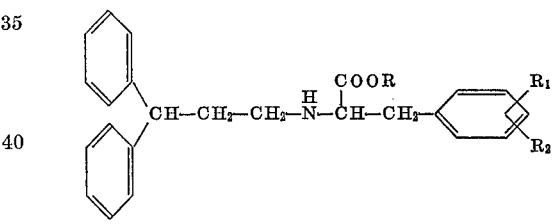

wherein R is lower alkyl and R$_1$ and R$_2$, which may be the same or different, are hydrogen, lower alkyl, or chlorine, and salts thereof.

2. N - [3,3-diphenylpropyl(1)]-phenylalanine-methylester.

3. N - [3,3 - diphenylpropyl(1)] - p - chlorophenylalanine--ethylester.

4. N - [3,3 - diphenylpropyl(1)]-3,4-dimethylphenylalanine-methylester.

References Cited

UNITED STATES PATENTS 3,399,226   8/1968   Sarri _____ 260—471

LORRAINE A. WEINBERGER, Primary Examiner

L. ARNOLD THAXTON, Assistant Examiner

U.S. Cl. X.R.

260—999